US010729271B2

(12) United States Patent
Mauro et al.

(10) Patent No.: US 10,729,271 B2
(45) Date of Patent: Aug. 4, 2020

(54) FRUIT AND VEGETABLE CORING SYSTEM

(71) Applicants: Dennis Willard Davis, Palm Bay, FL (US); Donna Christine Mauro, Sebastian, FL (US)

(72) Inventors: George Edward Mauro, Sebastian, FL (US); Dennis Willard Davis, Palm Bay, FL (US)

( * ) Notice: Subject to any disclaimer, the term of this patent is extended or adjusted under 35 U.S.C. 154(b) by 378 days.

(21) Appl. No.: 15/530,388

(22) Filed: Jan. 6, 2017

(65) Prior Publication Data
US 2017/0196394 A1   Jul. 13, 2017

Related U.S. Application Data

(60) Provisional application No. 62/387,855, filed on Jan. 7, 2016.

(51) Int. Cl.
*A47J 25/00* (2006.01)
(52) U.S. Cl.
CPC ...................... *A47J 25/00* (2013.01)
(58) Field of Classification Search
CPC ................. A47J 25/00; B21D 28/14
USPC ............... 30/113.1, 113.3, 278, 314
See application file for complete search history.

(56) References Cited

U.S. PATENT DOCUMENTS

| 2,150,046 | A | * | 3/1939 | Bard | A47J 25/00 30/130 |
| 3,128,810 | A | * | 4/1964 | Whipp | A47J 25/00 99/545 |
| 3,830,151 | A | * | 8/1974 | Gerson | B26D 3/26 99/537 |
| D549,527 | S | * | 8/2007 | Meyer | D7/672 |
| 2004/0069161 | A1 | * | 4/2004 | Bazzano | A23N 4/22 99/543 |
| 2004/0093737 | A1 | * | 5/2004 | Mauro | A47J 25/00 30/113.1 |
| 2004/0093738 | A1 | * | 5/2004 | Mauro | A47J 25/00 30/113.1 |
| 2007/0101577 | A1 | * | 5/2007 | Mauro | A47J 25/00 30/113.1 |

FOREIGN PATENT DOCUMENTS

DE          414272 C  *  5/1925  ............. A47J 25/00

\* cited by examiner

*Primary Examiner* — Jennifer B Swinney

(57) ABSTRACT

A fruit and vegetable coring system comprises a cylinder exhibiting a cutting edge on one end and attachment to a handle at the other end. This cylindrical blade is used to make a cylindrical incision about the core of a fruit (or vegetable) and slice through the entire depth of the fruit (or vegetable). A planar blade(s) is made part of the interior of the cylinder in the proximity of the cylindrical blade for the purpose of shearing the fruit core and freeing it from the fruit upon rotation of the cylinder. The change in the inner diameter of the cylinder due to the interior taper of the cylinder associated with the blade is disclosed to be sufficient to compress the fruit core and thereby retain it in the cylinder for removal from the fruit.

20 Claims, 22 Drawing Sheets

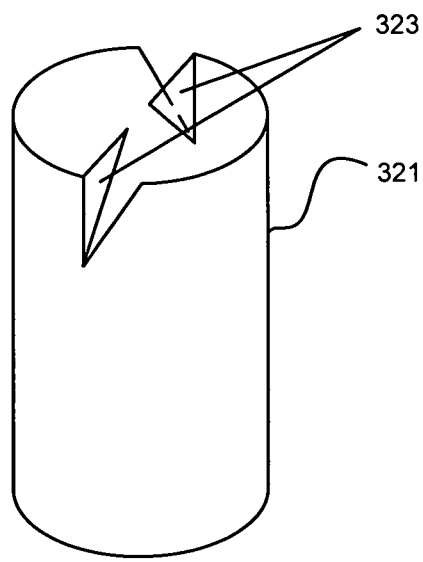
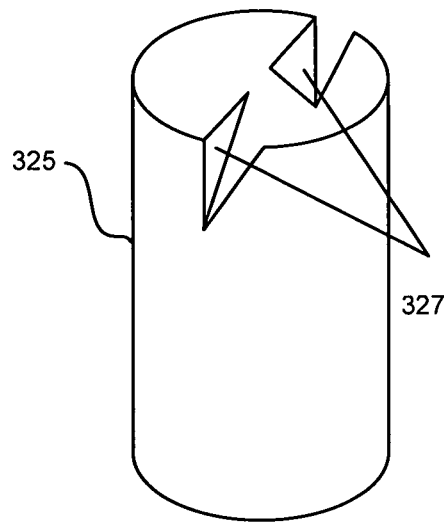
Fig. 11A          Fig. 11B
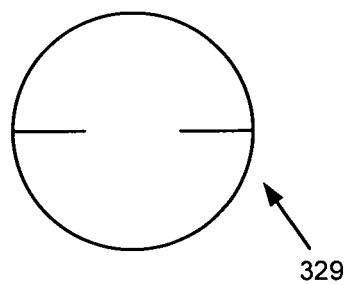
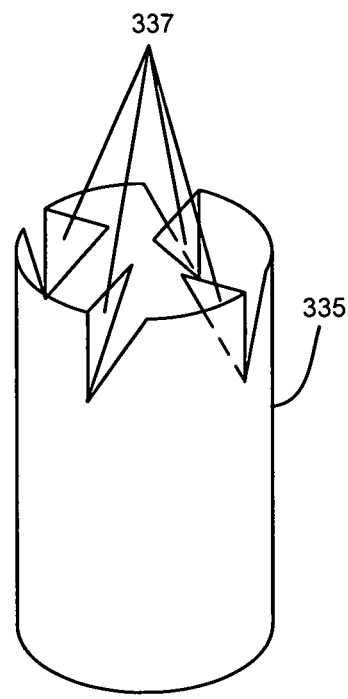
Fig. 11C
Fig. 11D
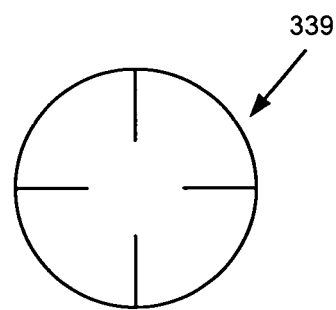
Fig. 11E

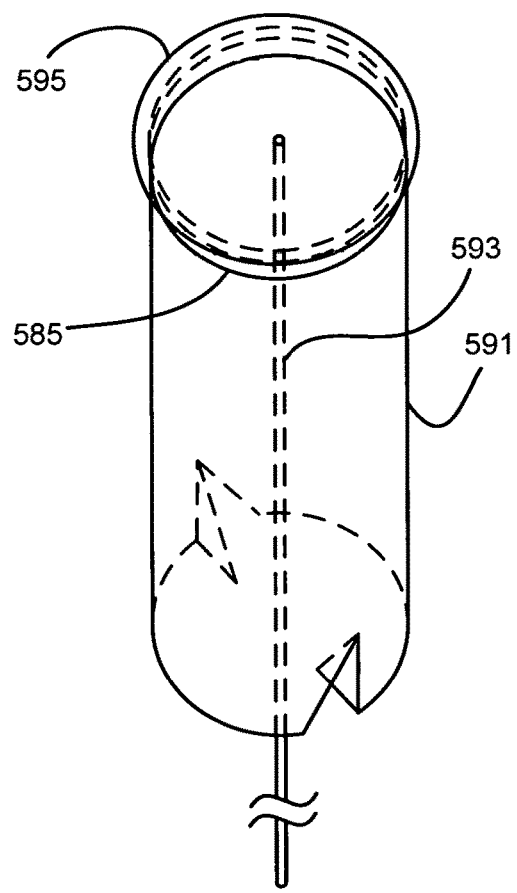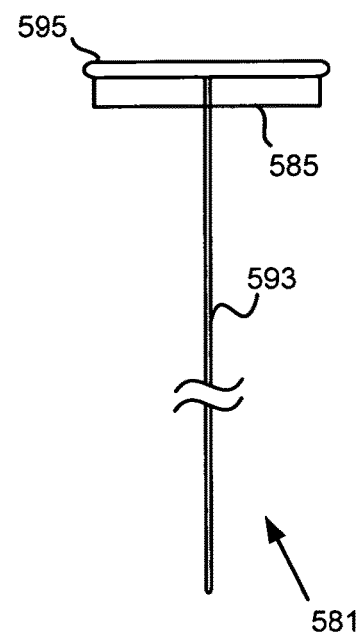
Fig. 22A
Fig. 22B

FRUIT AND VEGETABLE CORING SYSTEM

CROSS-REFERENCE TO RELATED APPLICATIONS

This application claims the benefit of U.S. provisional application Patent Application Ser. No. 62/387,855, filed Jan. 7, 2016 for "Fruit and Vegetable Coring System" by George E. Mauro and Dennis W. Davis.

BACKGROUND OF THE INVENTION

Typical coring devices for apples are designed to remove the apple core by removing a plug, including the core, from a bore which extends completely through the apple. An example of such a device is illustrated in FIG. 1. This prior art device 11 comprises a part circular elongate blade 15 having serrated edges 13 extending for much of the length of the blade from a handle 21 to a pointed blade end 17. The pointed end 17 is inserted, usually from the stalk end of the apple, and the device is then rotated about a longitudinal axis defined by the blade while the blade 15 is pushed into the apple so that the teeth of the serrated edges 13 cut or tear the apple about its core until the blade 15 projects from the end of the apple opposite the stalk. The device is then removed, often leaving the core plug containing the core in place for separate removal, thereby adding a separate step in the removal of the core and leaving a bore open at both ends. Some coring applications benefit from an incomplete bore which leaves a small portion of the apple at the bottom of the core intact, thereby providing a floor for the retention of inserted foodstuffs during a baking operation.

In another prior art arrangement, a circular tube, having a serrated circular edge extends away from a handle to which it is connected by a part circular member. This prior art device has similar drawbacks to those described with reference to FIG. 1.

U.S. patent application 20070101577 to Mauro discloses a coring device comprising a circular cylindrical member having the proximal end attached to a handle and the distal end having a blade edge. The cutting edge of the cylindrical member is introduced into the fruit and advanced to the desired depth in the fruit. Various embodiments of the device include planar blades in the interior of the cylindrical member for the purpose of shearing the core at the distal end of the cylindrical member when it is rotated in the fruit, thereby separating it from the fruit. What is needed is a means to ensure removal of the fruit core, once it is cut and separated from the fruit. Additionally, means to align the coring blade with the core of the fruit would be helpful.

The coring system offers the option of completely coring the fruit or vegetable or leaving a closed ended bore (blind hole) to facilitate filling and retention of cooking stuffs during baking or cooking. The presently disclosed coring system can be used to core a variety of fruits and vegetables. The system is most useful for fruits and vegetables that are characterized by having a plurality of small seeds or well-defined cores (ex. apples, pears, citrus fruit, squash, onions, etc.) As an example, in the case of apples, a combination of raisins, sugar, and cinnamon can be introduced into the core to produce a well-flavored baked apple. Various spice and other food mixtures can be introduced into fruits and vegetables for cooking. Even vegetables such as potatoes without a core can be cored so as to fill them with cooking ingredients or they may be partially cored in various ways to produce decorative foods.

OBJECTS OF THE INVENTION

It is an object of the present invention to provide an improved coring device suitable for use in easily removing the core of a fruit or vegetable, such as an apple, in one step.

It is also an object of the present invention to provide a closed ended bore to provide for retention of a filling in the bore with foodstuffs during baking to produce a baked fruit or vegetable.

It is also an object of the present invention to provide such a coring device which is economical and easy to manufacture while having a long life expectancy as well as great durability and reliability.

SUMMARY OF THE INVENTION

The present invention provides a fruit coring system comprising a handle and a cylindrical compression member having first and second ends and defining a longitudinal axis, the cylindrical compression member having an interior region, the first end of the cylindrical compression member being fastened with the handle and the second end defining a cylindrical cutting edge, or cylindrical blade, and at least one planar blade having a blade cutting edge, the planar blade(s) being supported within the interior region of the cylindrical compression member such that, in a preferred embodiment, the planar blade cutting edge lies substantially in a plane parallel to the longitudinal axis of the cylindrical compression member.

The cylindrical cutting edge may be defined by at least one taper formed in the cylindrical compression member, alternatively converging tapers may be formed in the cylindrical compression member with each taper having an angle of about 15° with respect to the axis. The reduction in the inner diameter of the cylindrical compression member due to blade taper providing sufficient compression of the sliced fruit (or vegetable) as it enters the cylinder to permit retention of the sliced portion (core) of the fruit within the cylindrical compression member for removal from the surrounding portion of the fruit.

It is to be understood that the term "cylindrical", as used hereinafter and in the appended claims, means any tubular shape that is circular or substantially circular in cross section (perpendicular to the longitudinal axis of the tubular shape) such as, for example, octagonal, hexagonal, a square with rounded corners, other polygonal shapes, a ring, or a cylindrical ring, etc., regardless of whether or not the cylindrical compression member includes an air bleed passage. Generally speaking, the substantially cylindrical compression member or cylindrical cutting edge may comprise a plurality of planar surfaces interconnected with one another into a generally circular or oval configuration to form a leading cutting edge for cutting a bore in fruit. It is to be appreciated that the term "cylindrical" is also intended to cover arrangements in which the cutting edge is only partially cylindrical, e.g., the cutting edge only extends 180 degrees or greater. If desired, the member cutting edge may be serrated to facilitate cutting a bore within the fruit.

The handle preferably has two opposed extensions extending away from the longitudinal axis for ease of manual use.

The blade may be a single blade, a pair of opposed blades, or various configurations of multiple blades.

The cylindrical compression member may have a substantially continuous side wall extending from the first to the second end or merely may have a substantially continuous leading second end which is connected to the handle by two or more legs or some other rigid support to securely attach or affix the cylindrical compression member to the handle and prevent movement of the handle relative to the cylindrical compression member.

A sidewall of the cutting member or cylindrical compression member may be provided with an air passageway to allow air to bleed into the apple or fruit as the core is removed therefrom. This facilitates easier removal of the core as it substantially lessens the vacuum created within the apple or fruit during core removal.

Various means for aligning the cylindrical compression member with the axis of the fruit are disclosed with include guides with pins for insertion in the fruit and caliper-like means.

BRIEF DESCRIPTION OF THE DRAWINGS

The invention will now be described by way of example with reference to the accompanying drawings. in which:

FIG. 11A is a pictorial view of the cylindrical compression member which includes two planar blades formed from the cylindrical compression member itself using a first cylinder cutting geometry;

FIG. 11B is a pictorial view of the cylindrical compression member which includes two planar blades formed from the cylindrical compression member itself using a second cylinder cutting geometry;

FIG. 11C is a cross-sectional view of the cylindrical compression member of either FIG. 11A or FIG. 11B;

FIG. 11D is a pictorial view of the cylindrical compression member which includes four planar blades formed from the cylindrical compression member itself;

FIG. 11E is a cross-sectional view of the cylindrical compression member of FIG. 11D.

FIG. 22A is a pictorial view of a coring system which includes a fourth pin-based core alignment means;

FIG. 22B is a cross-sectional view of the cap and pin portion of the coring system of FIG. 22A;

DESCRIPTION OF PREFERRED EMBODIMENTS

Figure 1:
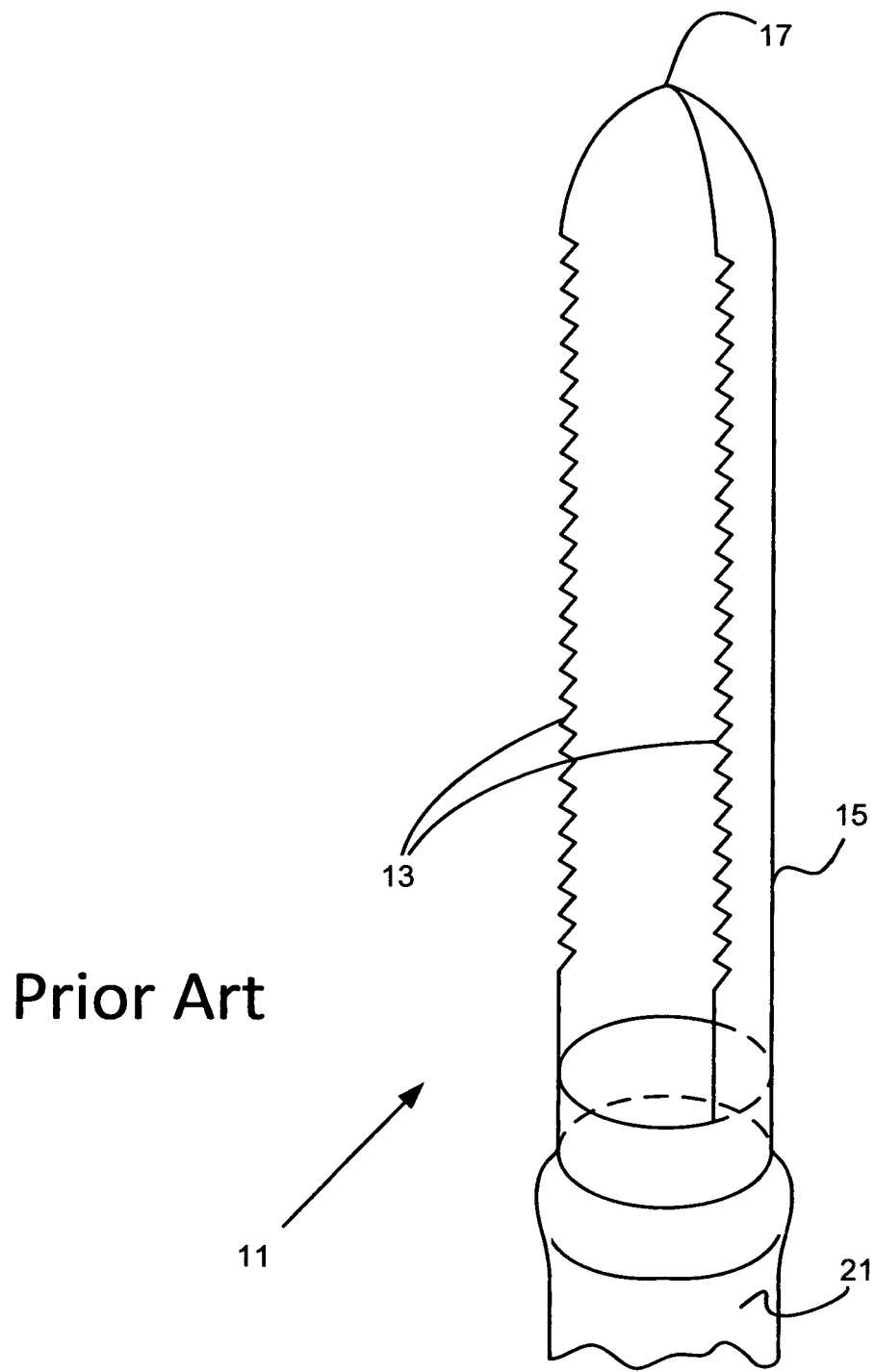
FIG. 1 illustrates a prior art apple corer.
Figure 2:
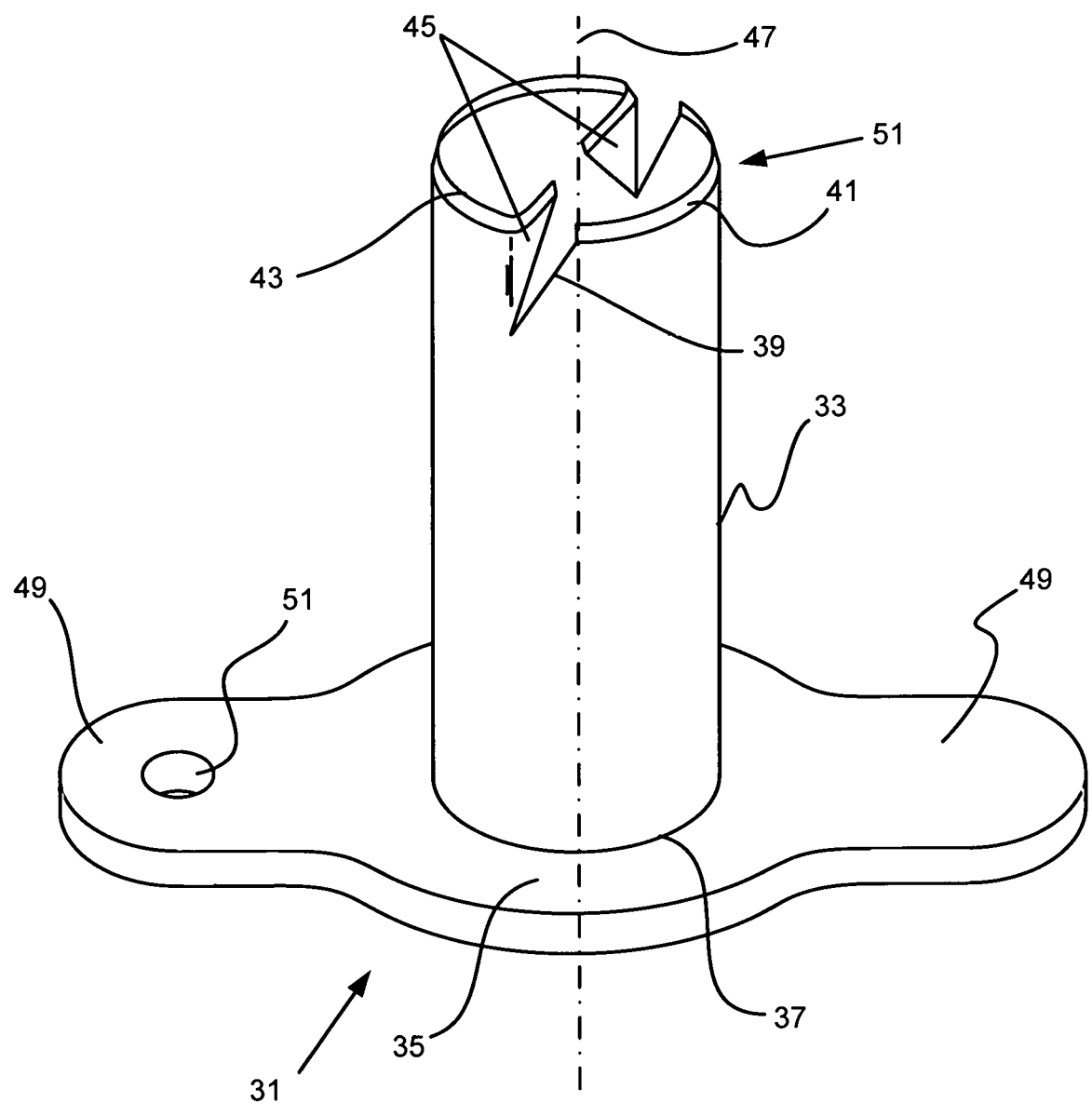
FIG. 2 is a perspective view of a preferred embodiment of the fruit (vegetable) coring system of the present invention.

Referring first to FIG. 2 a fruit coring system 31 comprises a cylindrical member 33 extending from a first end 37, attached to a handle 35, to an opposite second end 51 which forms a leading cutting edge or cylindrical blade 43. The taper 41 of this blade 43 is depicted in exaggerated fashion. Planar blade surfaces 45, which are largely parallel to the longitudinal axis 47 of cylindrical compression member 33, are formed by cuts 39 made in the sides of the cylindrical compression member 33 and folding the cut portions inward. The cylindrical blade 43 is used to slice a cylindrical volume enclosing the core of a fruit. If it is desired to retain a floor of fruit below an extracted fruit core, then the cylindrical compression member is inserted so as to avoid penetrating the bottom of the fruit. When the cylindrical compression member 33 is inserted to the desired depth in the fruit, it is rotated so that the planar blade surfaces 45 will shear the sliced core from the fruit. The handle 35 may be integral with the first end 37 or made fast with the first end 37 by the use of a conventional attachment mechanism. e.g., a press-fit, an adhesive, rivets, welding, etc. and defines a pair of opposed projections 49 which permit ease of manual use. Also depicted is a thumb hole, or perforation 51 for hanging the coring system on a hook when not in use.

Figure 3A:
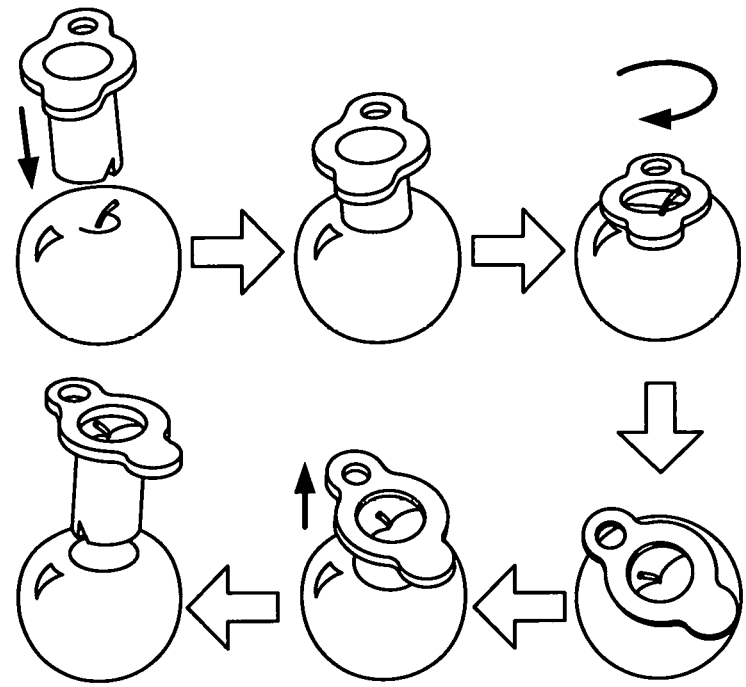
FIG. 3A is a sequence of pictorial views of the coring process using the coring system of FIG. 2.
Figure 3B:
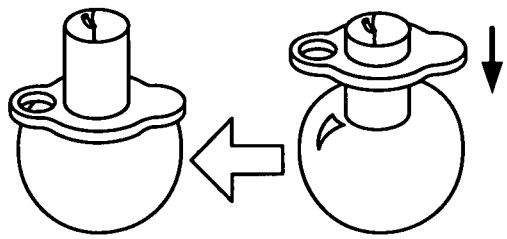
FIG. 3B is a sequence of pictorial views of the coring system used to core a sequence of fruits.
Figure 3C:
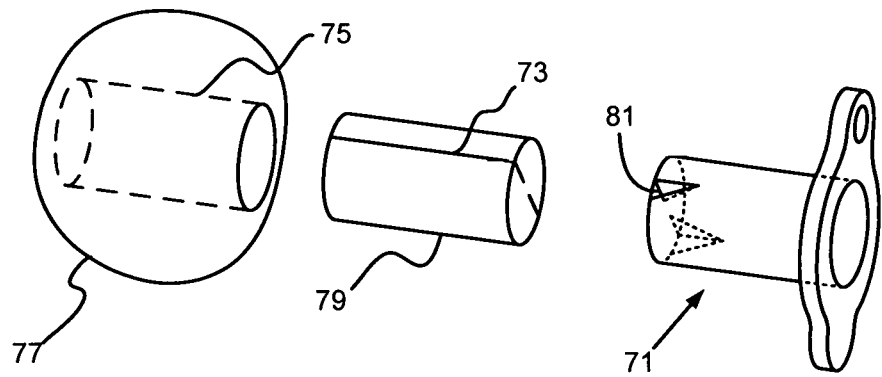
FIG. 3C is an exploded pictorial view of the coring system and the cored fruit.

The appropriate use of the coring system 31 for removal of a fruit core is illustrated with reference to FIG. 3A, showing a sequence of steps associated with the coring process. First, the coring system 31 is oriented in axial alignment with the core of the fruit. Subsequently, it is inserted downward into the fruit to a desired depth, thereby slicing a cylindrical surface interior to the fruit. It is then rotated so that the fruit core is sheared from the fruit. As will be described below, the cylindrical compression member 33 is designed so that as the cylindrical compression member is withdrawn from the fruit, the core will be retained therein. The coring system 31 can be immediately used to core another fruit and the previously retained core will be ejected from cylindrical compression member 33 by the subsequent core as depicted in FIG. 3B. FIG. 3C is an exploded diagram of the results of the coring process. A fruit 77, such as an apple for example, is shown with a cored volume 75. The extracted core 79 exhibits slits 73 resulting from incisions by the planar blades 81 of the coring system 71.

Figure 4A:
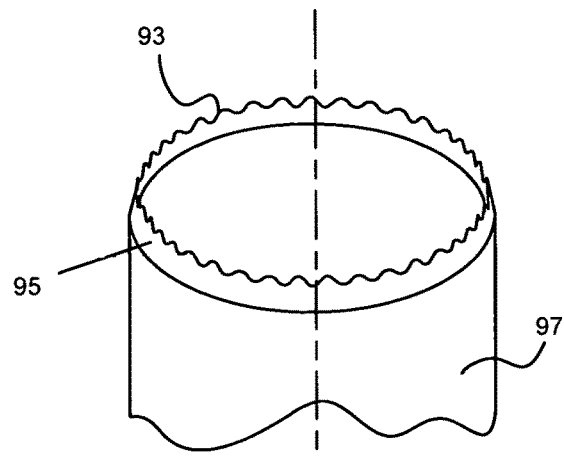
FIG. 4A is a pictorial view of a serrated cylindrical blade.
Figure 4B:
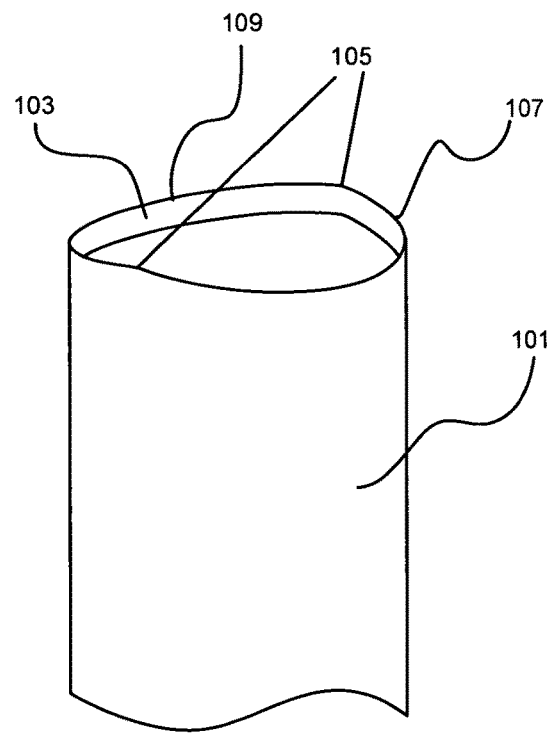
FIG. 4B is a pictorial view of the cylindrical blade having pronouncements to facilitate puncture of fruit or vegetable skins.
Figure 5A:
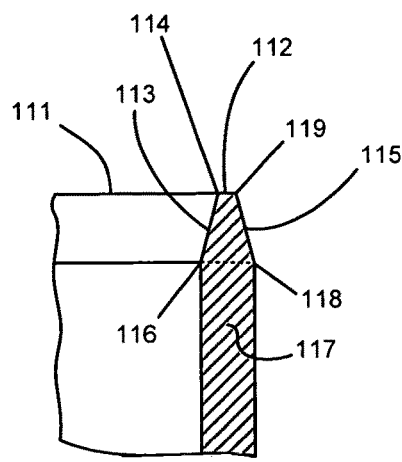
FIG. 5A is a cross-sectional view of a cylindrical blade having a dual taper.
Figure 5B:
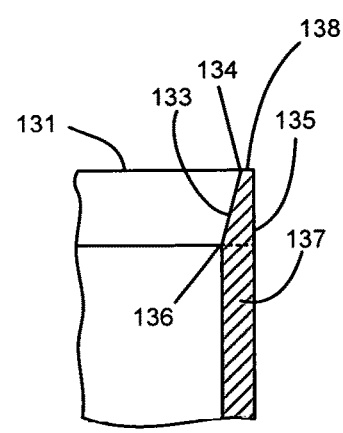
FIG. 5B is a cross-sectional view of a cylindrical blade having an interior taper.

Variations in the geometry of the cylindrical blade 43 of FIG. 2 are shown in FIGS. 4A, 4B, 5A, and 5B. In FIG. 4A, the blade 95 at the end of cylindrical compression member 97 shows serrations 93 that are an alternative to a uniform, flat-edged cylindrical blade. FIG. 4B is a pictorial view of a cylindrical compression member 101 exhibiting a cylindrical blade 103 that has two scalloped edges 107 and 109 that form pronouncements 105 along the edges for the purpose of readily puncturing the skin of a fruit or vegetable. Other blade contours, besides scallops, may be used to achieve the pronouncements and are within the scope of this disclosure. The cross-sectional view of a portion of cylindrical compression member 33 of FIG. 2, depicting various taper geometries for the cylindrical blade is provided in FIGS. 5A and 5B. In FIG. 5A, a section 117 of the cylindrical compression member adjacent the cylindrical blade 111 is shown with both exterior and interior tapered surfaces, 115 and 113, respectively. In the cross section, the exterior tapered surface 113 originates at point 118 and terminates at point 119. The interior tapered surface 115 originates at point 116 and terminates at point 114. The flat-edged cylindrical blade is formed by surfaces 113, 115, and flat end surface 112. In FIG. 5B, a section 137 of the cylindrical blade is shown with a tapered interior surface 133 and an untapered exterior surface 135. In cross-section, surface 133 is inclined relative to surface 135 by an angle that is preferably about 15 degrees. The interior tapered surface originates at point 136 and terminates at point 134. In this case, the flat-edged cylindrical blade is formed by surfaces 133, 135, and flat end surface 138.

Figure 6:
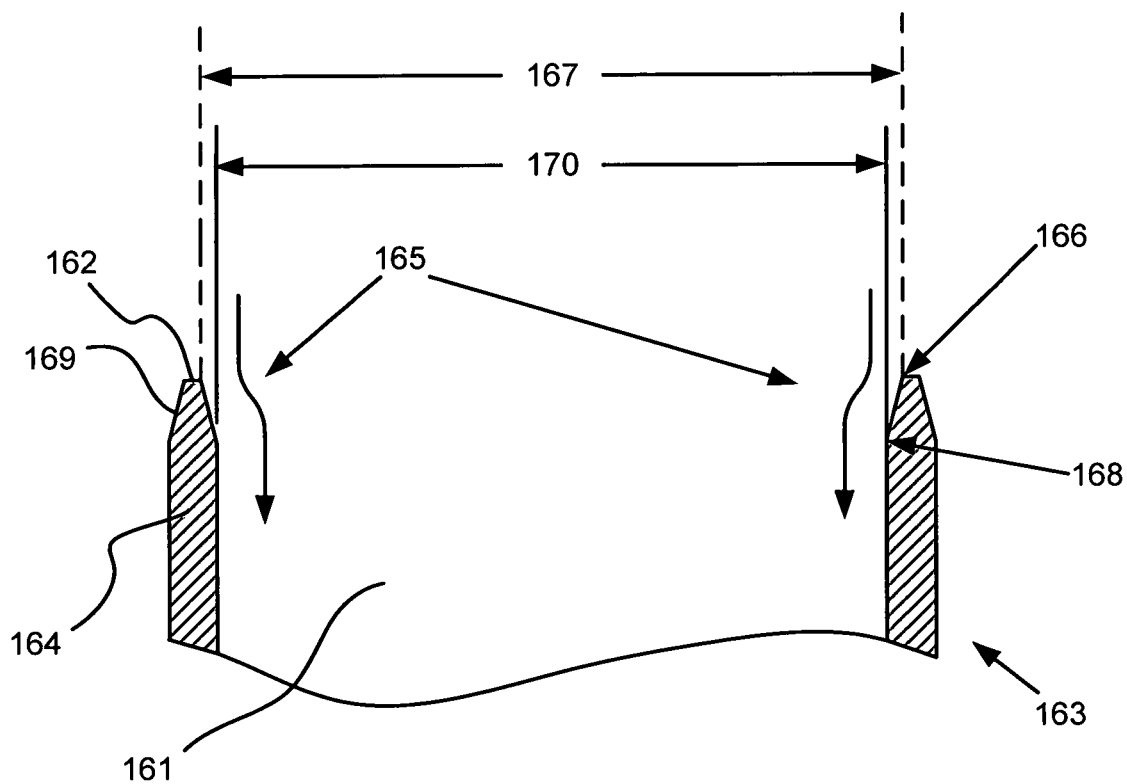
FIG. 6 is a cross-sectional view of the cylindrical blade cutting the core of a fruit, emphasizing the region of core compression.

Once the fruit core is sliced and sheared from the fruit, it remains to extract it from the fruit; the core must be retained in the cylindrical compression member 33 of FIG. 2 when the coring device is removed from the fruit. In order for this to happen, the sliced core must undergo adequate compression to facilitate its retention in cylindrical compression member 33. This is achieved by proper design of the coring device as depicted in FIG. 6. The cross-sectional diagram depicts the cylindrical compression member 163 and the tapered circular blade 169. The difference between the inner diameter 167 of the cylindrical compression member 163 at the edge of the blade 169 and the inner diameter 170 of the cylindrical compression member 163 at the origin 168 of the taper causes the fruit core 161 in the region 165 to be compressed as the cylindrical compression member 163 is advanced into the fruit. The reduction in the inner diameter of the cylindrical compression member 163 will lead to a pressure increase of the fruit against the inner wall of the cylindrical compression member as the fruit is compressed in accordance with the bulk modulus of the apple tissue. Once the apple core is sheared free of the apple and the cylindrical compression member is retracted from the fruit, the core tends to remain in place in the apple given atmospheric pressure operating against the partial vacuum associated with retraction of the core. Counteracting this atmospheric force is the friction force of the apple core against the inner wall of the cylindrical compression member 163. This friction force is proportional to the interior surface area of the cylindrical compression member 163, which in turn is proportional to the length of the cylindrical compression member 163. Hence, for a given length of cylindrical compression member 163, there is a threshold change in the inner diameter of the cylindrical compression member 163 that will permit the friction force to overcome the atmospheric force and allow the core to be removed from the apple upon retraction of the cylindrical compression 163 member from the fruit. Also, for a given length of the cylindrical compression member 163, there is an upper bound on the change in inner diameter of the cylindrical compression member 163 that will permit ease of removal of the core from the cylindrical compression member 163 once fully retracted from the fruit. In summary, the change in the inner diameter of the cylindrical compression member 163 must be great enough to extract the core from the fruit, but not so great as to make it difficult to extract the core from the coring device.

The bulk modulus, K, of a solid (in the case of apple tissue, for example) is a measure of the amount of pressure $\Delta P$ required to obtain a certain fractional compression $\Delta V/V$ where V is the initial volume.

$$K = V \Delta P / \Delta V$$

In the case of a cylinder, the fractional volume change is equal to the fractional diameter change $$\Delta V/V = \Delta D/D$$

where D is the diameter and $\Delta D$ is the change in diameter of the cylinder. Hence, the associated pressure is $$\Delta P = K \Delta D/D$$

and the compressive force is $$F_c = \Delta P^*(\text{Area of cylinder wall}) = K \Delta D/D^* (\pi D^2/4)^* L = \pi (D \Delta DL)/4$$

where L is the length of the cylinder.
The associated friction force is $$F_f = \sigma_f F_c = \pi \sigma_f (D \Delta DL)/4$$

where $\sigma_f$ is the coefficient of friction between apple and cylinder wall.

The force countering this friction force is the difference between atmospheric force on the cross-sectional area of the cylinder and the partial vacuum that forms upon retraction of the core. For the core to be removed from the apple against a perfect vacuum, the friction force associated with the core against the cylinder surface must be greater than the atmospheric force, $F_{atm}$, tending to keep the core in place.

$$F_{atm} = P_{atm}^*(\text{cross-sectional area of cylinder}) = 14.7 \text{ psi}^*(\pi D^2/4)$$

However, it is the case that the sliced core in the apple does not maintain a perfect vacuum when retracted with the coring tool and hence, the percentage of atmospheric force in action is considerably less than 100%. With reference to FIG. 2, preferred dimensions for the length of the cylindrical compression member 33 from the cutting edge 41 to the proximate surface of the handle 35 is about 1.7 inches and the inside diameter of the cylindrical compression member 33 is about 1.0 inch. There are a number of variables that affect the optimality of the amount of taper of the cylindrical compression member 33. These include a) the anisotropy of the bulk modulus of the apple tissue, b) variation in the bulk modulus of apple tissue with type of apple and water content, c) inhomogeneity of the apple core, d) variation in the coefficient of friction between apple and cylinder surface, and e) the selected length of the cylinder. In the face of these variables, it has been determined that the appropriate change in inner diameter of the cylindrical compression member 163 (associated with blade taper) to achieve the aforementioned core extraction is in the range of 0.020 to 0.070 inches for a diameter of one inch. For larger diameter cylindrical compression members, this corresponds to between 2 and 7 percent of the diameter. As depicted in FIGS. 5A and 5B, there are two geometry options for the cutting edge 41 of FIG. 2, dual or single taper. Each surface exhibits a taper angle relative to the longitudinal axis of the cylindrical compression member; the associated taper angles need not be the same in the case of the dual tapered blade of FIG. 5A. However, It must be emphasized that it is the interior tapered surface that must adequately change the inner diameter of the cylindrical compression member to achieve adequate compression of the fruit (or vegetable) core. Various blade taper angles may be used; a convenient angle for the single taper blade is about 15 degrees relative to the longitudinal axis of the cylindrical compression member. The flat end surface (112 and 138 in FIGS. 5A and 5B, respectively) of the cylindrical blade should be approximately 0.005 inches, or so, in order to limit blade sharpness and thereby prevent inadvertent cutting of the hand when the coring device is in manual use.

Figure 7A:
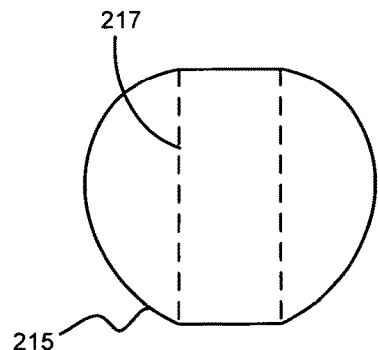
FIG. 7A is a cross-sectional view of a fruit cut using the cylindrical compression member of FIG. 7C.
Figure 7B:
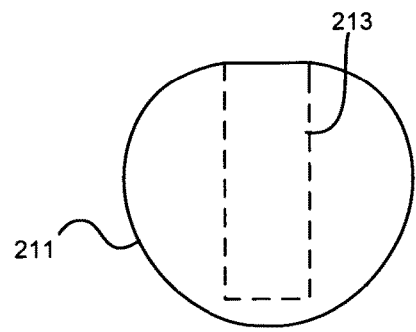
FIG. 7B is a cross-sectional view of a fruit cut using the cylindrical compression member of FIG. 7D.
Figure 7C:
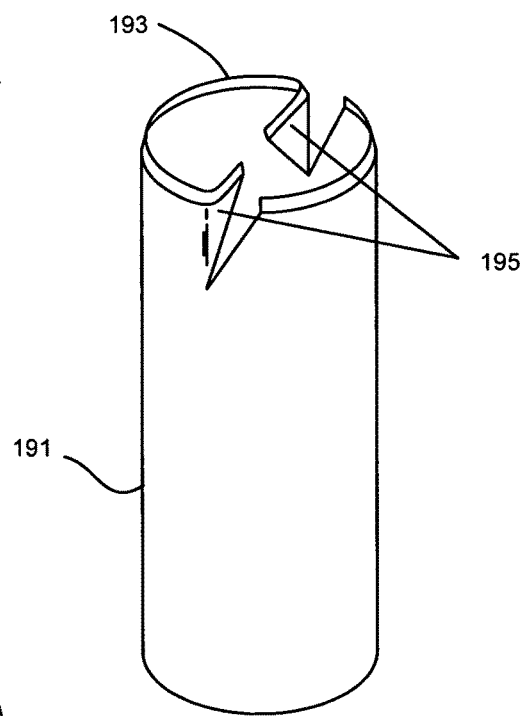
FIG. 7C is a pictorial view of a long version of the cylindrical compression member of the coring system.
Figure 7D:
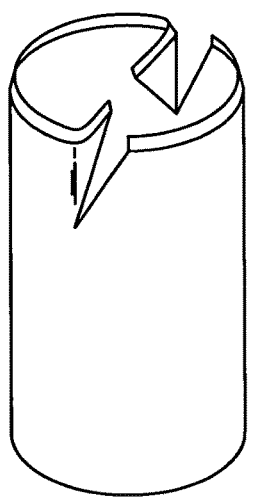
FIG. 7D is pictorial view of a short version of the cylindrical compression member of the coring system.
Figure 7E:
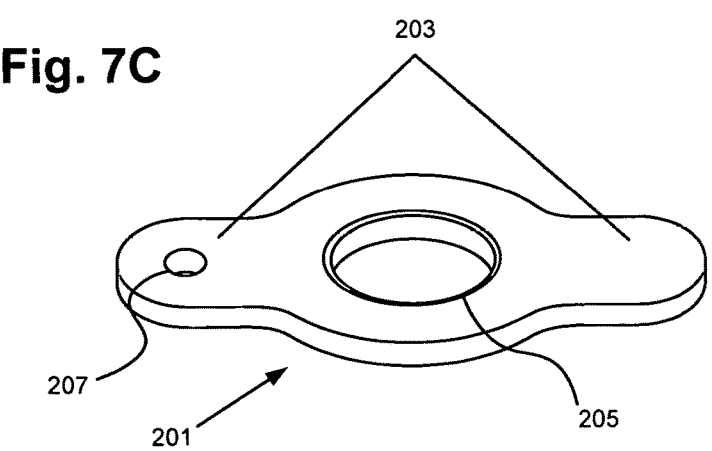
FIG. 7E is a pictorial view of the handle of the coring system.
Figure 8A:
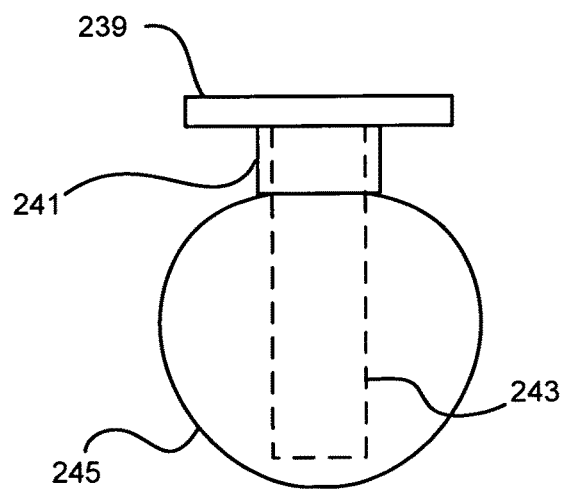
FIG. 8A is a cross-sectional view of the coring system which includes a large standoff collar.
Figure 8B:
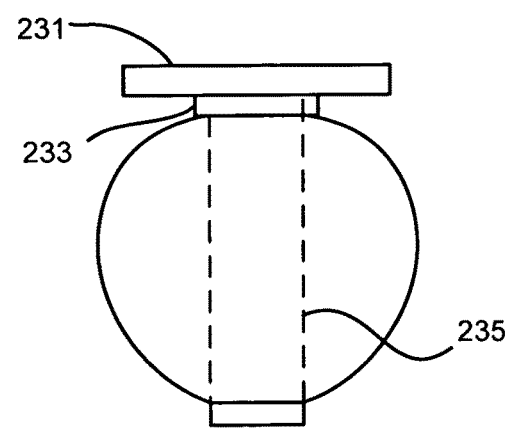
FIG. 8B is a cross-sectional view of the coring system which includes a small standoff collar.
Figure 9A:
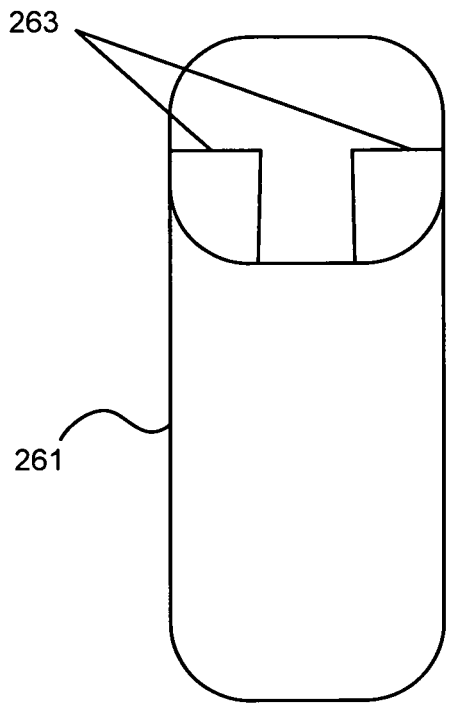
FIG. 9A is a pictorial view of a cylindrical compression member having a cross-section which square with rounded corners and planar blades attached to the interior.
Figure 9B:
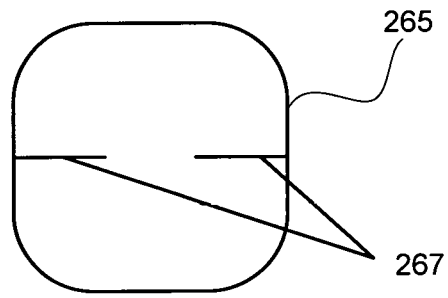
FIG. 9B is a cross-sectional view of the cylindrical compression member of FIG. 9A.
Figure 9C:
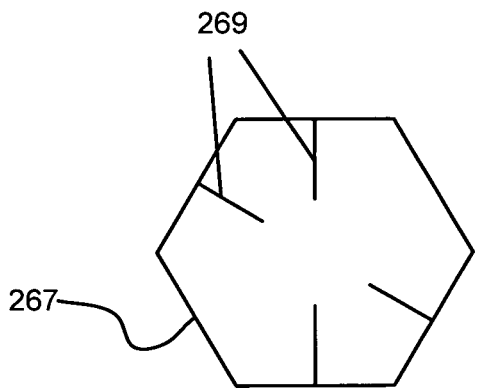
FIG. 9C is a cross-sectional view of an hexagonal cylindrical compression member containing planar blades attached to the interior.
Figure 9D:
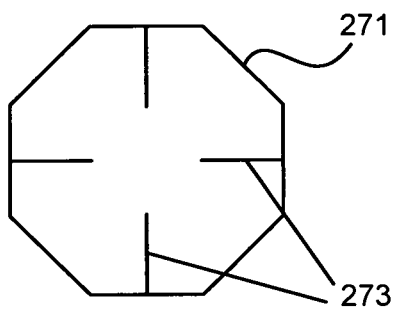
FIG. 9D is a cross-sectional view of an octagonal cylindrical compression member containing planar blades attached to the interior.
Figure 9E:
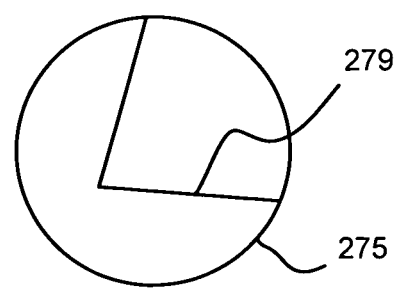
FIG. 9E is a cross-sectional view of a cylindrical compression member containing V-shaped blades attached to the interior.

As previously mentioned, there can be different modes of use of the coring system. In some applications, it is desirable to remove the entire core as depicted in the cross-sectional diagram of FIG. 7A showing the fruit 215 with an evacuated core volume 217. Alternatively, as shown in FIG. 7B, a fruit 211 can have the core removed while permitting an evacuated core volume 213 that exhibits a floor within the fruit. Various embodiments of the coring system permit achieving both modes of coring. One embodiment uses cylindrical compression members of differing lengths as shown in FIGS. 7C and 7D that can be interchanged with the handle 201 shown in FIG. 7E. The long cylindrical compression member 191 of FIG. 7C exhibits the previously disclosed cylindrical blade 193 and planar blade surfaces 195. Cylindrical compression member 191 represents a length sufficient to completely core the fruit as shown in FIG. 7A. The shorter cylindrical compression member 199 of FIG. 7C represents a length that will core the fruit while retaining a floor below the cored volume as shown in FIG. 7B. Another embodiment that achieves the same objectives comprises the inclusion of standoff collars placed around the cylindrical compression member in proximity of the coring system handle. In FIG. 8A, the coring system 239 is shown with a relatively tall collar 241 that results in a coring volume 243 enclosed by a floor. In contrast, the short collar 233 used with coring system 231 of FIG. 8B results in complete coring of the fruit with an open coring volume 235. Alternatively, to achieve different coring depths, the handle can be made to be repositioned along the length of the cylindrical compression member by threading or other means well known in the prior art such as a spring-loaded button on the handle that can be inserted into holes The cylindrical compression member 33 of FIG. 2 can assume different cross-sectional shapes with a variety of planar blade geometries as depicted in FIGS. 9A through 9D. These include the compression member with rounded square cross-section 261 of FIGS. 9A and 9B with planar blades 263, hexagonal cross-section 267 of FIG. 9C with planar blades 269, and the octagonal cross-section 271 of FIG. 9D with planar blades 273. FIG. 9E depicts a circular cross section 275 with a v-shaped blade 279, the planes of which are parallel to the longitudinal axis of the cylindrical compression member.

Figure 10:
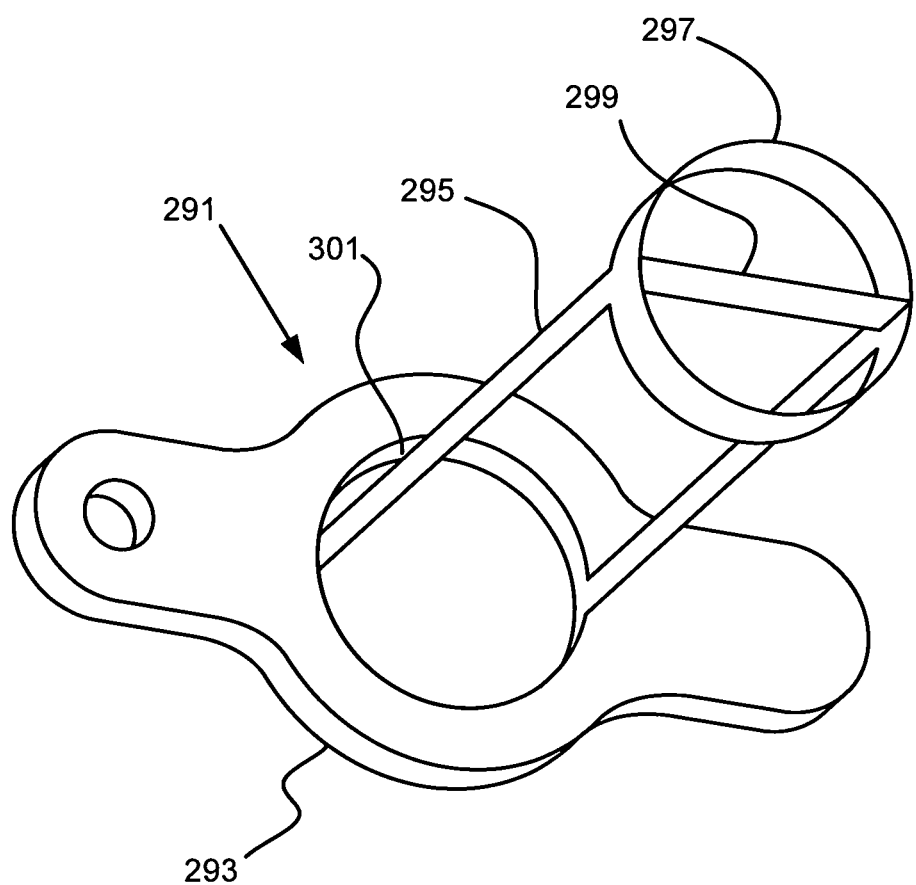
FIG. 10 is a pictorial view of the coring system which exhibits two legs for support of the cylindrical blade and a planar blade.

Resection of portions of the cylindrical compression member are anticipated as in FIG. 10, which shows a coring system 291 with a portion of the cylindrical compression member surface in the form of legs 295 supporting a circular blade 297 and planar blade 299 by attachment through a ring 301 to handle 293.

In a preferred embodiment of the coring system shown in FIGS. 11A and 11B, the wall of the cylindrical compression member 327 is cut at a plurality of locations circumferentially about the cylindrical blade 325. These cut portions of the wall are folded inward to the cylindrical compression member 321 to form planar blade surfaces that are substantially parallel to the longitudinal axis of the cylindrical compression member 321. In FIG. 11A, planar blade surfaces 323 are shown that result from cuts that are antisymmetric about the longitudinal axis of cylindrical compression member 321. The planar blade surfaces 327 result from cuts that are symmetric about the longitudinal axis of cylindrical compression member 321. Both approaches to forming the planar blades result in the cross-sectional geometry of FIG. 11C. Other means of forming planar blades interior to the cylindrical compression member include attachment of preformed blades to the cylinder by methods well known in the prior art including brazing, riveting of blade flanges, etc. FIG. 11D depicts a cylindrical compression member 335 exhibiting four planar blade surfaces 337; the cross-sectional view 339 is provided in FIG. 11E.

Figure 12:
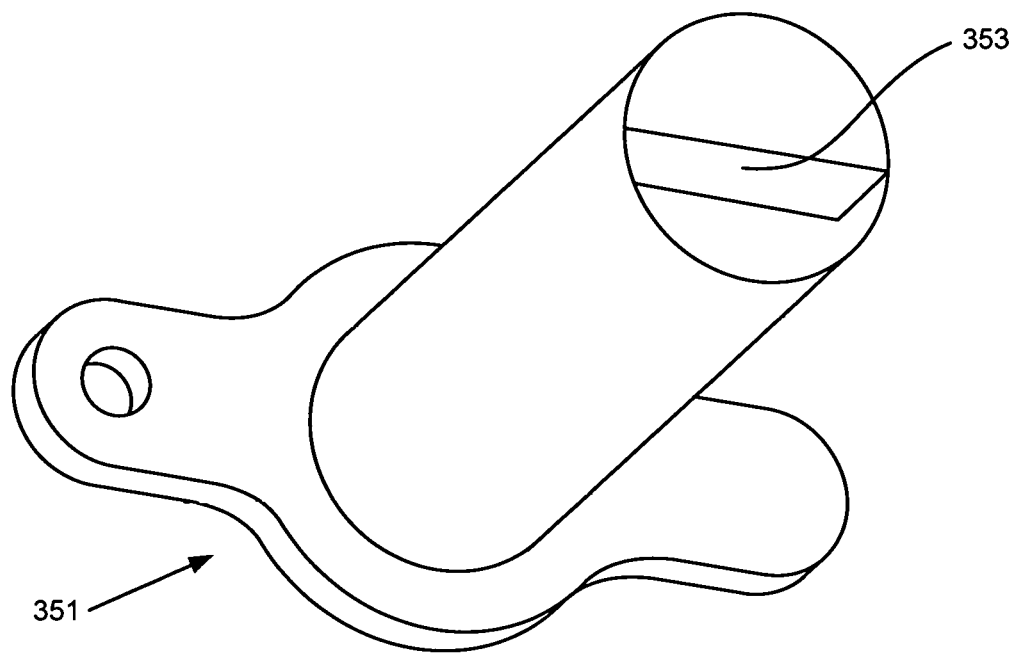
FIG. 12 is a pictorial view of a coring system exhibiting a single, planar cutting blade interior to the cylindrical compression member.
Figure 13:
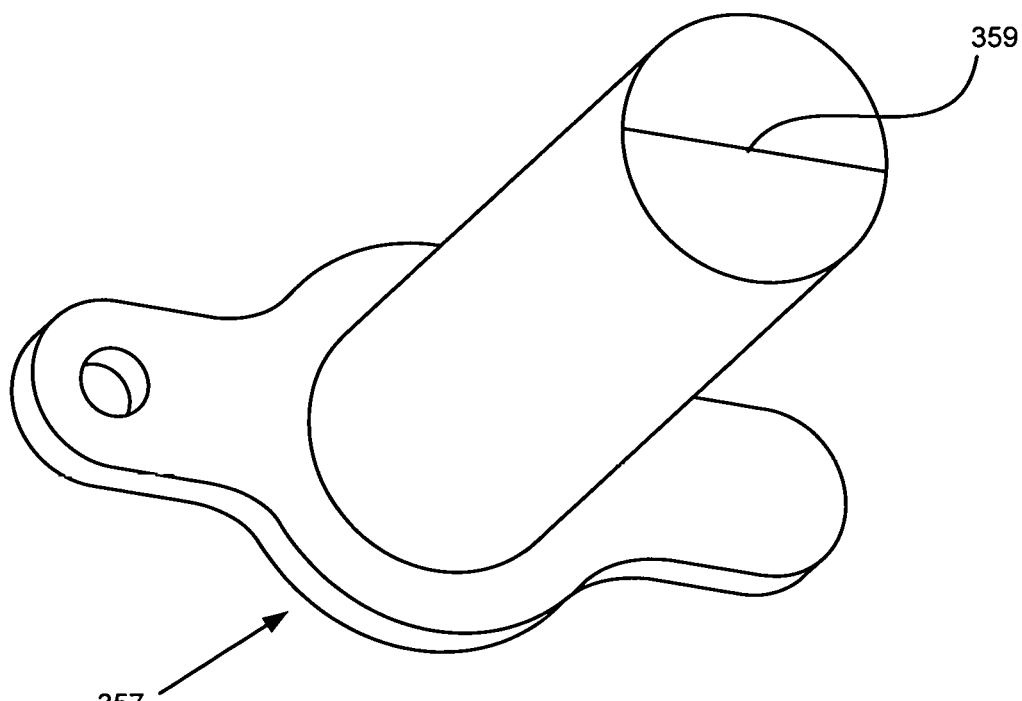
FIG. 13 is a pictorial view of a coring system exhibiting a wire cutting means interior to the cylindrical compression member.
Figure 14A:
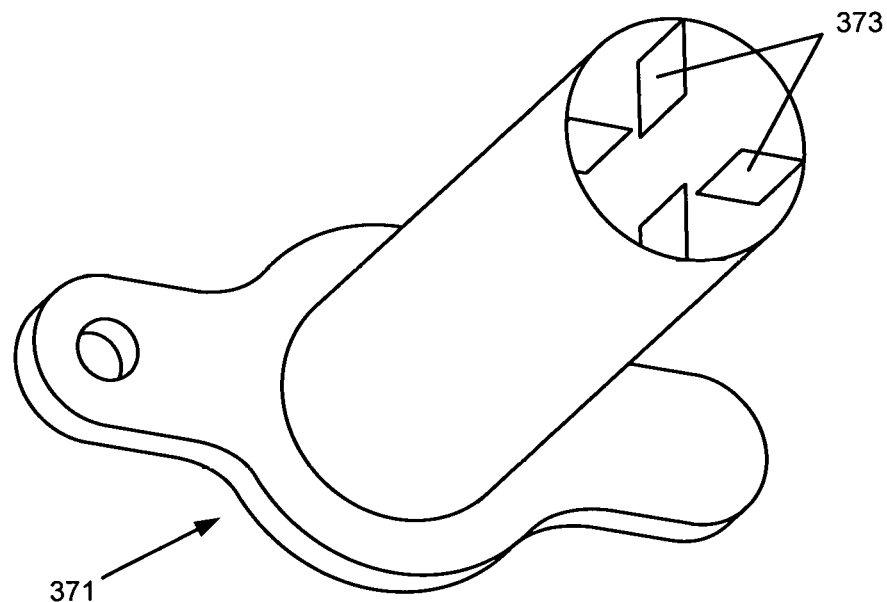
FIG. 14A is a pictorial view of a coring system exhibiting four planar cutting blades interior to the cylindrical compression member.
Figure 14B:
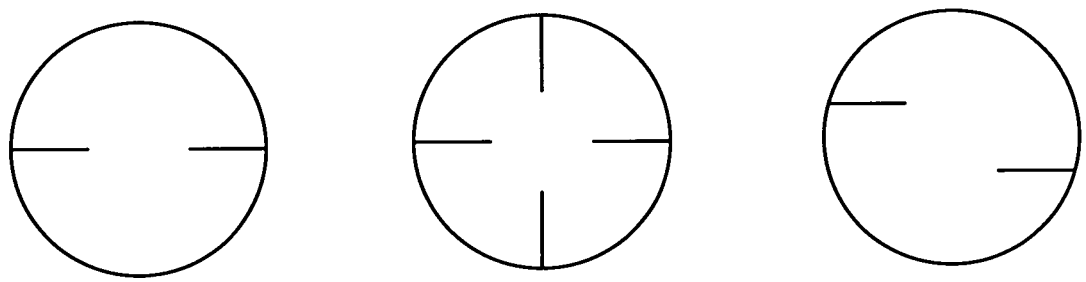
FIG. 14B is a plurality of cross-sectional views of a cylindrical compression member containing various geometries of multiple blades interior to the cylindrical compression member.
Figure 14B:
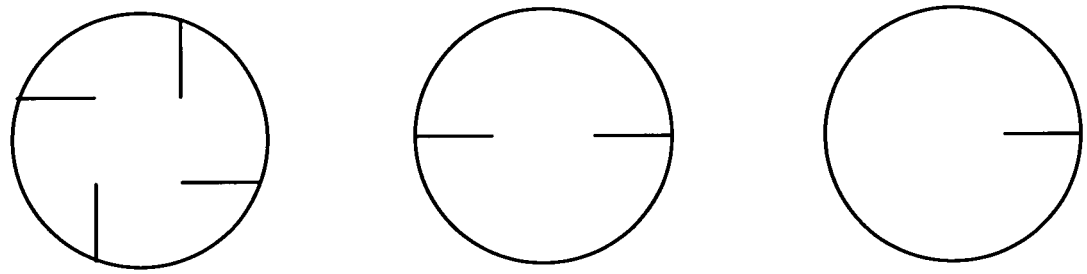
Figure 15A:
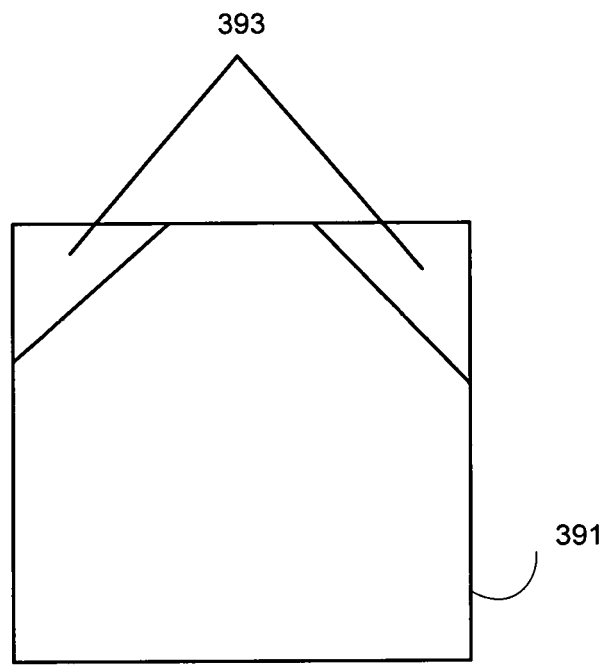
FIG. 15A is a cross-sectional view of an alternate polygonal shape of planar blades interior to the cylindrical compression member.
Figure 15B:
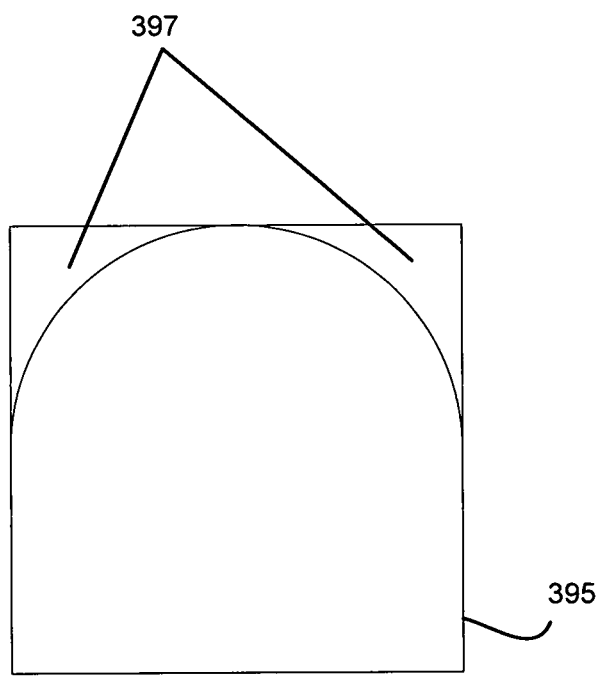
FIG. 15B is a cross-sectional view of planar blades interior to the cylindrical compression member that exhibit curvilinear edges.
Figure 16:
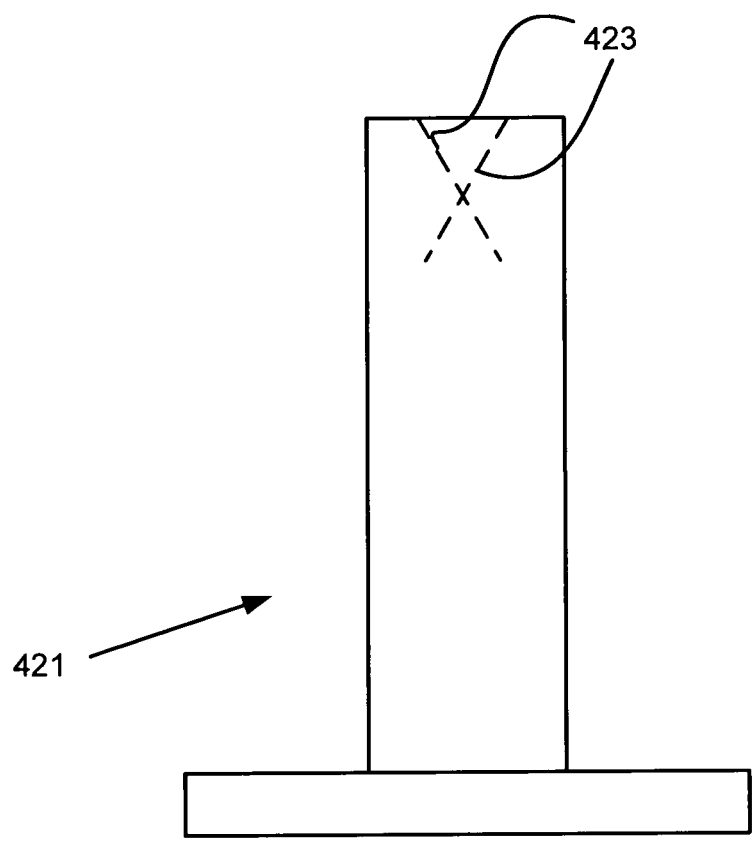
FIG. 16 is a cross-sectional view of a coring system in which planar blades are attached interior to the cylindrical compression member at an angle to the longitudinal axis of the cylindrical compression member.
Figure 17:
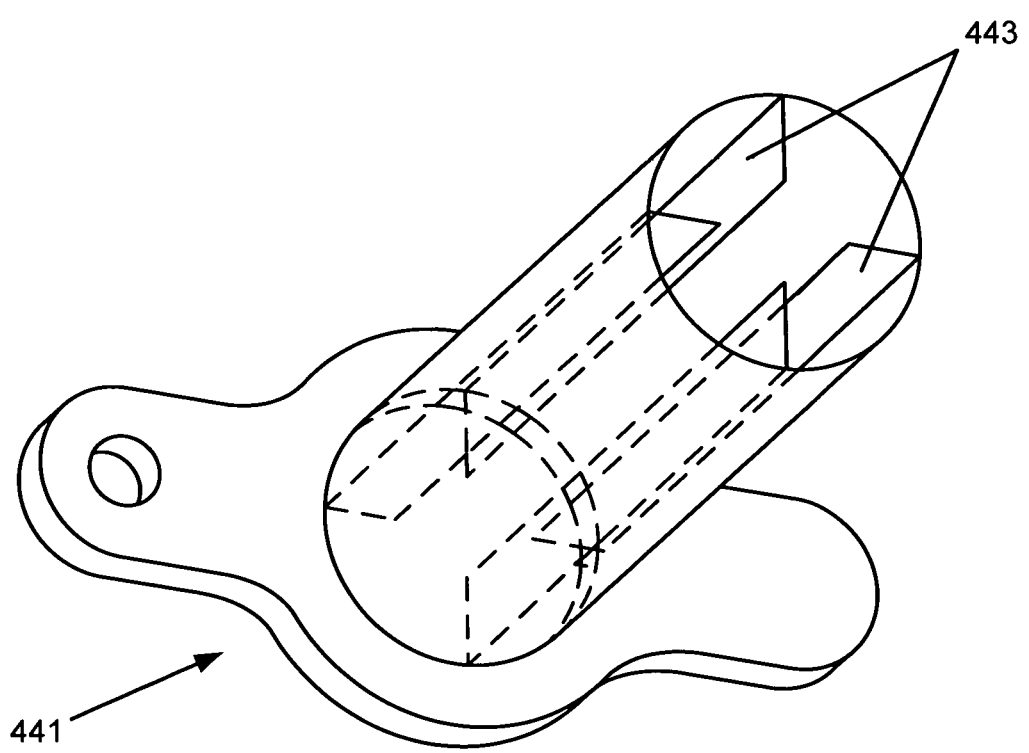
FIG. 17 is a pictorial view of a coring system in which planar blades interior to the cylindrical compression member extend the full length of the cylindrical compression member.
Figure 18:
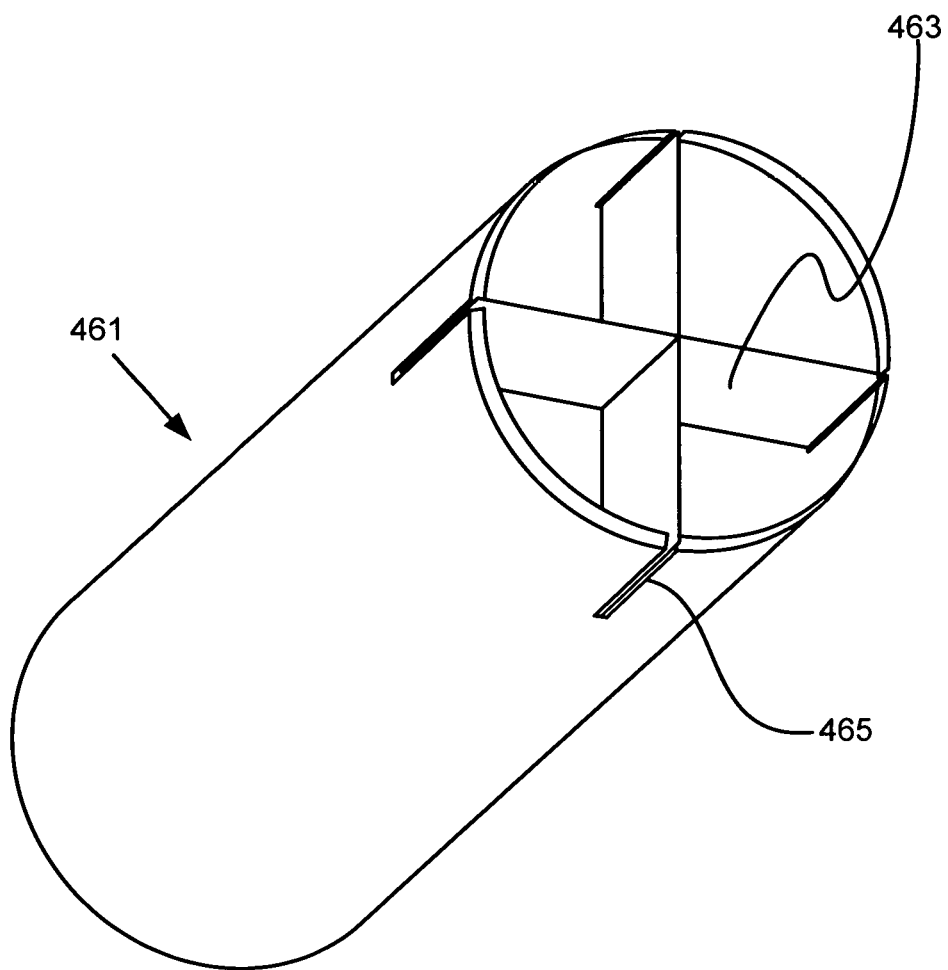
FIG. 18 is a pictorial view of a coring system which includes planar blades interior to the cylindrical compression member that intersect at right angles.

Other interior blade formats are possible that will achieve shearing of the core from the fruit. A first example includes a planar blade 353 extending the full diameter of the cylindrical compression member in the coring system 351 of FIG. 12. A second example is that of a wire 359 affixed to the cylindrical compression member of the coring device 357 of FIG. 13. Multiple planar blade geometries exploit the use of various numbers of such blades 373 as shown in FIGS. 14A and 14B. The actual shapes of the planar blades can be polygonal, as exemplified by the triangular blades 393 of FIG. 15A or have a curvilinear perimeter as in the case of the blades 397 depicted in FIG. 15B. FIG. 16 illustrates a coring system 421 with planar blades 423 oriented at an angle with respect to the longitudinal axis of the cylindrical compression member. The length of the planar blades can be short as previously depicted or can run the full length of the cylindrical compression member and shown by the rectangular planar blades 443 of FIG. 17. An intersecting cross geometry for the planar blades is provided in FIG. 18. Herein, the blades 463 are shown press fit into slots 465 in the cylindrical compression member 461, but could be attached by any number of previously discussed means.

Figure 19A:
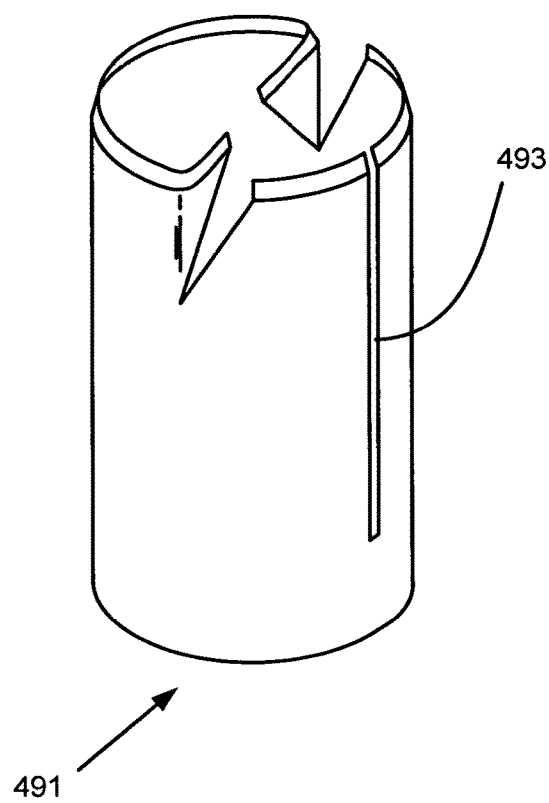
FIG. 19A is a pictorial view of a cylindrical compression member exhibiting a longitudinal slit.
Figure 19B:
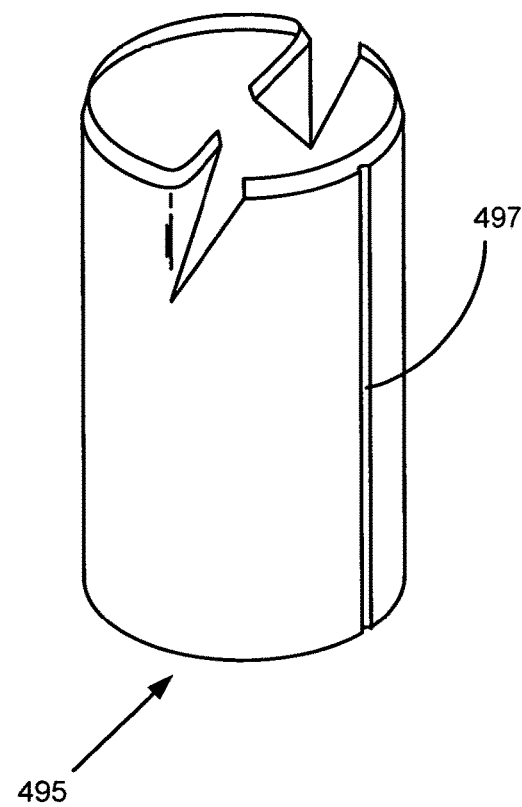
FIG. 19B is a pictorial view of a cylindrical compression member exhibiting a longitudinal trough.

Subsequent to insertion of the coring system into a fruit and rotation of the system to shear the core, when the system is removed from the fruit, there is often a partial vacuum associated with its removal. This vacuum can be mitigated by air channels shown in either FIG. 19A or 19B. In FIG. 19A, an air channel is formed by a slit 493 formed in the wall of cylindrical compression member 491. In FIG. 19B, an alternative means of forming an air channel is a depression or groove 497 in the wall of cylindrical compression member 495.

Core Alignment Subsystem

Various core alignment subsystems are illustrated in FIGS. 20 through 24. In FIG. 20A, the alignment subsystem 527 comprises a solid cylinder 529 of diameter slightly less than the inside diameter of the cylindrical compression member, with planar slots 531 parallel to the longitudinal axis of cylinder 529 extending the full length of cylinder 529. Additionally, a metal pin 533 protrudes from cylinder 529 along the cylinder longitudinal axis. The pin 533 is inserted into the core axis of the fruit until the cylinder 529 rests against the fruit. Then, the cylindrical compression member 521 of the coring system is lowered onto cylinder 529 with its planar blades 523 inserted into and passing through the slots 531 of cylinder 529. In this way, the coring system is aligned with the core of the fruit as the coring process proceeds and the rotation of the planar cutting means is unhindered by the presence of the cylinder 529. The geometry of the core alignment subsystem depicted in FIG. 20B is an adaptation of that shown in FIG. 20A to facilitate its unibody construction and manufacture from plastic. The cylinder 541 exhibits the same planar slots 539, but in lieu of a metal pin has a plastic pin supported by plastic fins 545 which are tapered so as to not interfere with the motion of the planar blades.

Figures 20A, 20B, 20C:
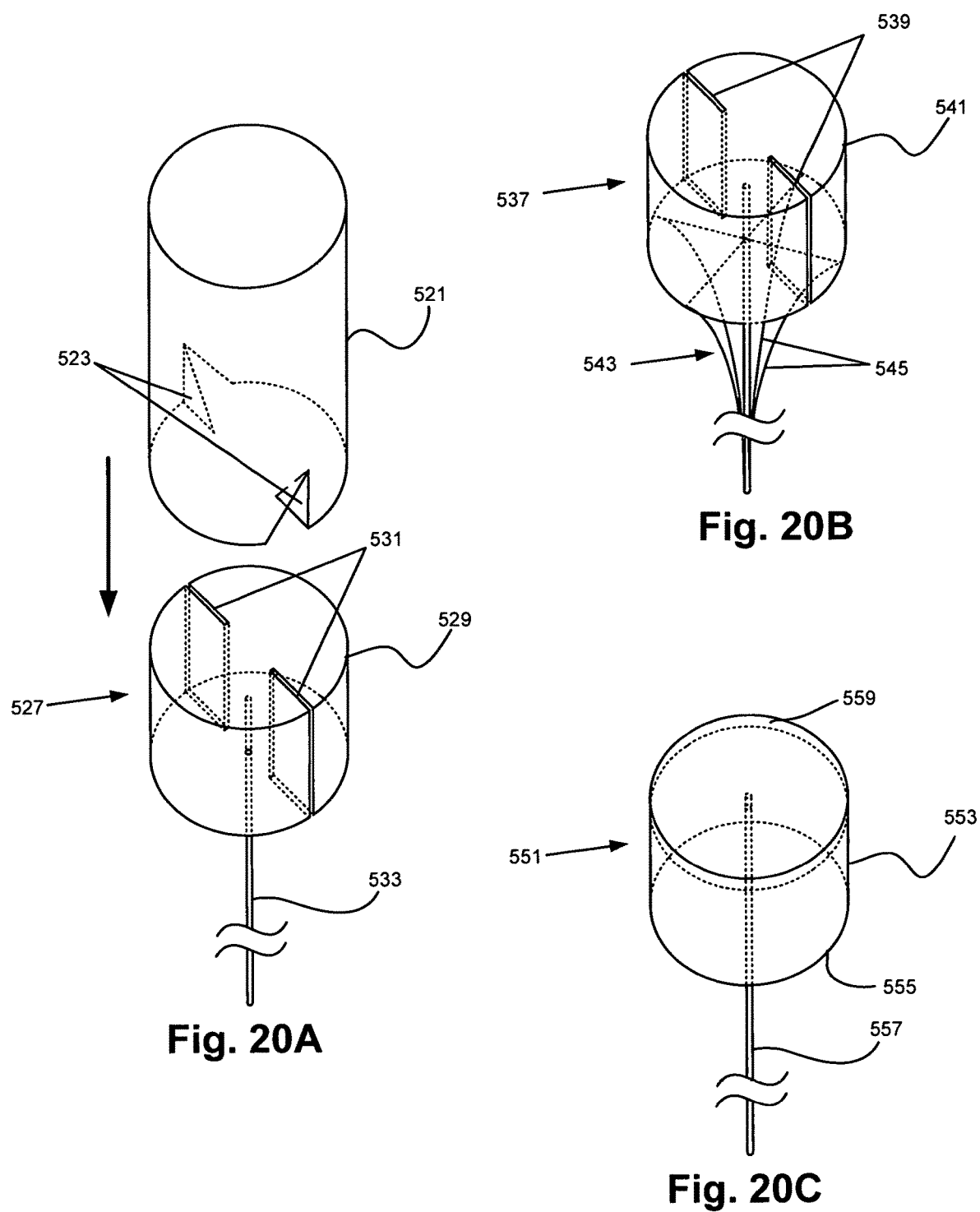
FIG. 20A is a pictorial view of a coring system which includes a first pin-based core alignment means.
FIG. 20B is a pictorial view of a coring system which includes a second pin-based core alignment means.
FIG. 20C is a pictorial view of a coring system which includes a third pin-based core alignment means.

FIG. 20C depicts another alignment approach in which a hollow cylinder 553 with a cap 559 is shown with a pin 557 attached to the cap 559; the pin is coaxial with the cylinder 553. The open edge of the cylinder 553 constitutes a cylindrical blade so that when the pin is inserted into the fruit along the core axis and the cylinder 553 is advanced, the cylindrical blade cuts a guide incision into the fruit. Upon removal of this alignment subsystem from the fruit, the cylindrical compression member of the coring system can be introduced along this guide incision insuring alignment of the coring system with the fruit core.

Figure 21A:
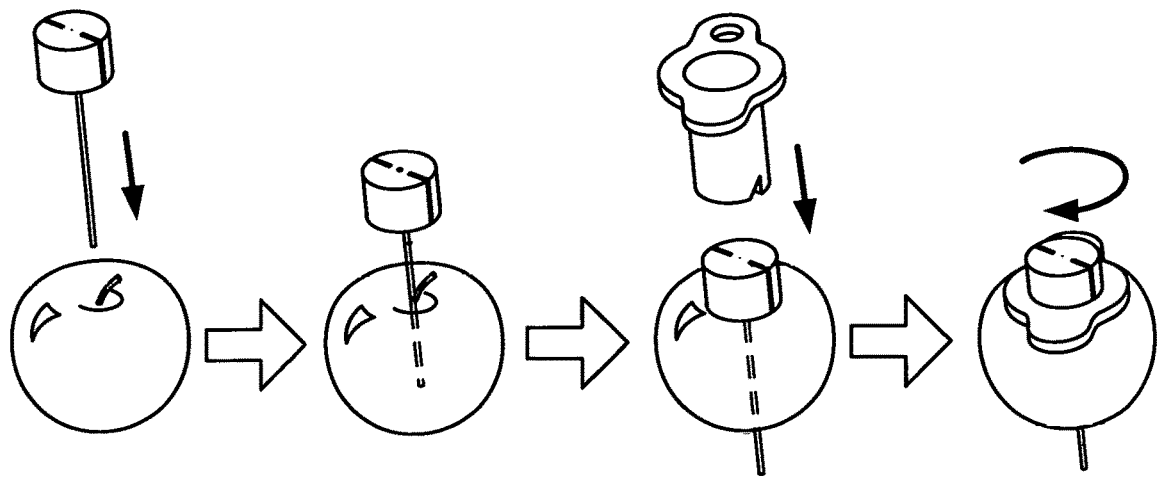
FIG. 21A is a sequence of pictorial views of the coring process using the coring system of FIG. 20A.
Figure 21B:
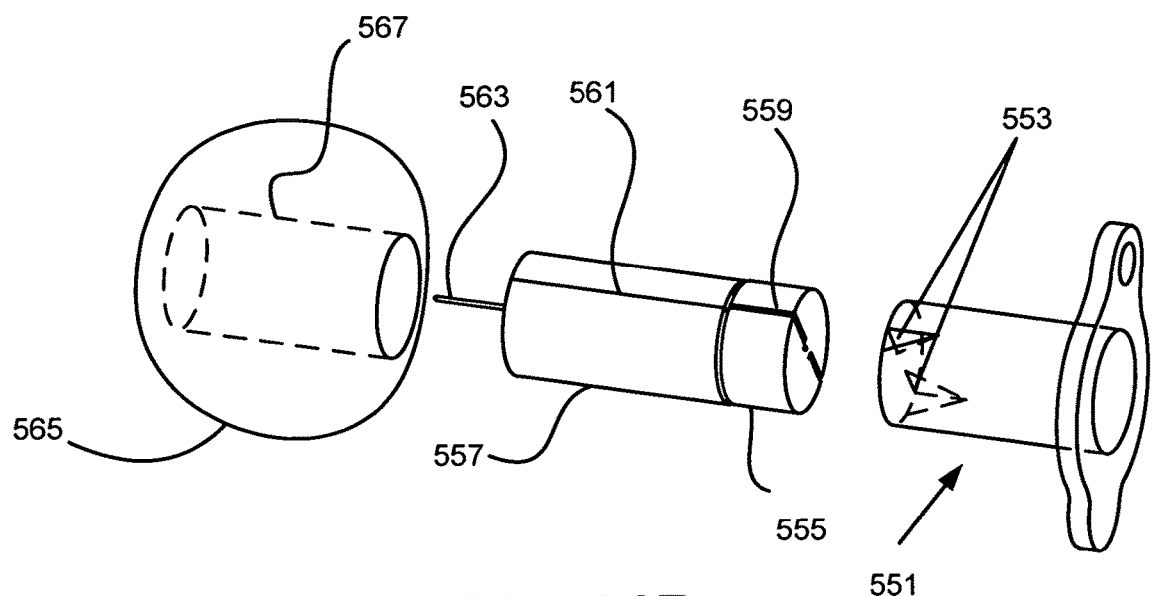
FIG. 21B is an exploded pictorial view of the coring system of FIG. 20A with the cored fruit.

The sequence of steps required to core fruit using the alignment subsystem of FIG. 20A is depicted in FIG. 21A. First the pin of the alignment subsystem is inserted into the fruit along the axis of its core; the pin is advanced until the slotted cylinder rests against the fruit. Subsequently, the coring system is lowered onto the slotted cylinder with the planar blades advancing through the slots. Once the cylindrical compression member is advanced to the desired depth, it is rotated by torque on the handle in order to shear the core from the fruit. FIG. 21B illustrates the result of this coring process with the fruit 565 having an evacuated core volume 567. The slotted cylinder 555 with pin 563 holds the sliced fruit core 557 showing incisions 561 produced by the planar blades of the coring system 551.

In another embodiment of the alignment subsystem shown in FIGS. 22A and 22B includes an alignment pin 593 that is affixed to the center of the cylindrical cap 595 and is largely coincident with the longitudinal axis of the cylindrical compression member 591 when the lip 585 of cylindrical cap 595 is inserted into the cylindrical compression member 591. When the cap 595 is attached to the cylindrical compression member 591 and the alignment pin 593 is inserted along the core axis of the fruit, this alignment subsystem permits direct alignment of the coring system with the core axis of the fruit.

Figure 23:
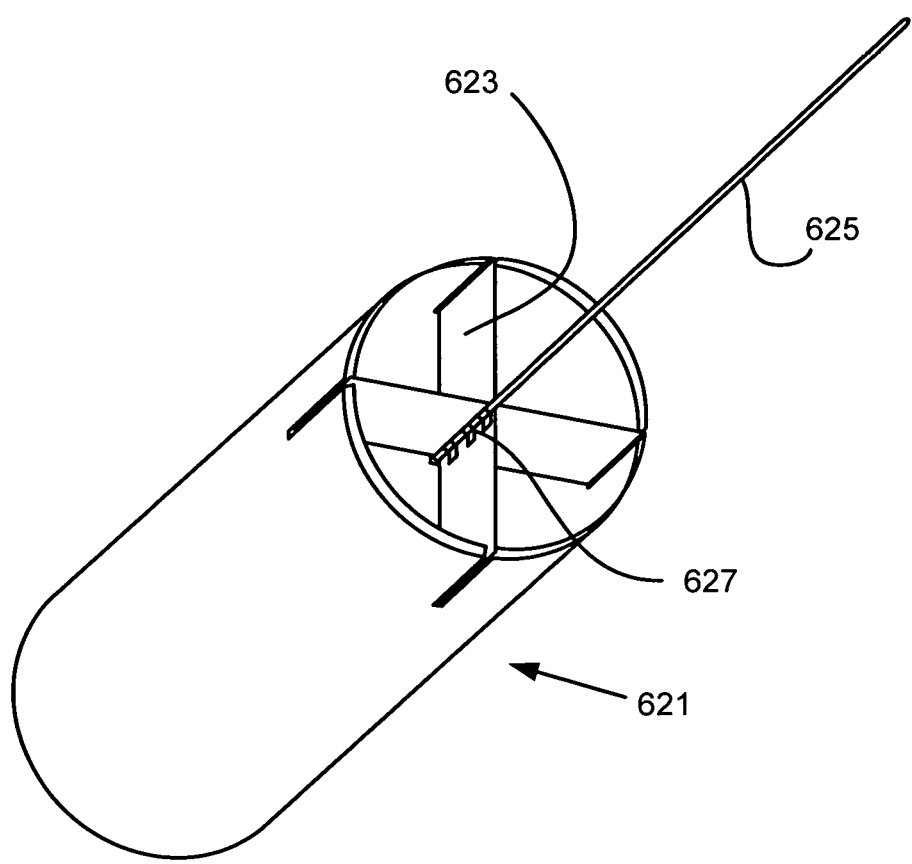
FIG. 23 is a pictorial view of a coring system which includes a fifth pin-based core alignment means.

In yet another embodiment of an alignment subsystem, FIG. 23 shows an alignment pin 625 that is coaxial with the longitudinal axis of the cylindrical compression member 621 and is affixed by means 627 to crossed planar blade 623.

Figure 24:
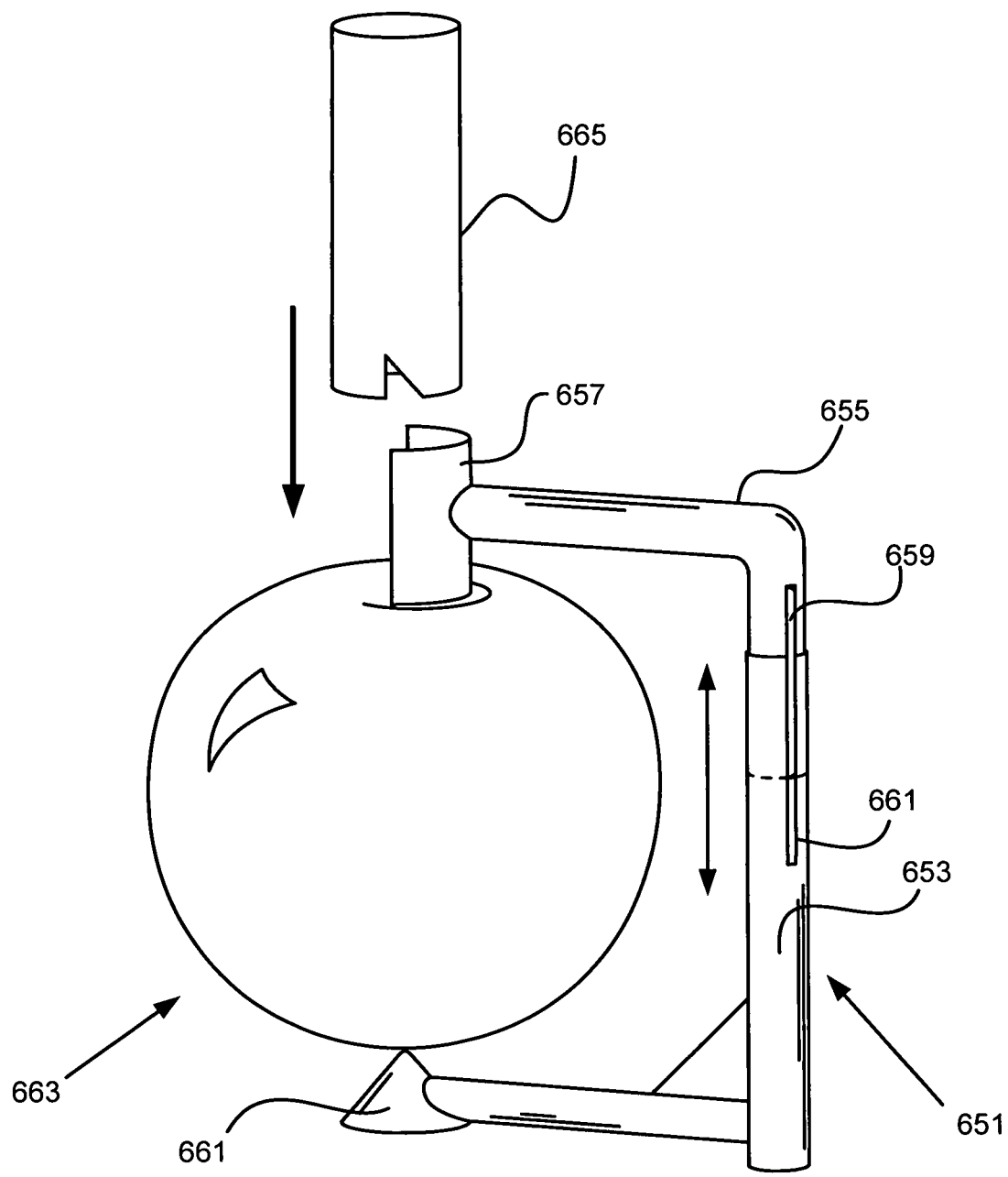
FIG. 24 is a pictorial view of a coring system which includes a "caliper-like" core alignment means.

In a final embodiment of an alignment subsystem, a caliper-like mechanism can be used with different fruit sizes. In FIG. 24 the mechanism is shown having two parts or arms 653 and 655 that are slidably attached. Arm 655 has a key 659 that slides into slot or keyway 661 in arm 653; this permits caliper-like sliding motion without rotation. The protrusion 661 at the end of arm 653 is positioned at a core indentation on one end of the fruit 663. The cylindrical section 657 at the end of arm 655 has a radius slightly larger than that of the cylindrical compression member 665. The cylindrical section is centered above a core indentation at the other end of the fruit and the two arms 653 and 655 are slid together so that the fruit rests between the protrusion 661 and the cylindrical section 657. Then the cylindrical compression member 665 is brought into conformal contact with the cylindrical section 657 and advanced into the fruit.

The invention claimed is:

1. A coring system for coring fruit and vegetables comprising:
    a. a cylindrical compression member exhibiting a longitudinal axis, a cylindrical wall having a wall thickness, a first end attachable to a handle, and a second end exhibiting cylindrical cutting means;
    b. cylindrical cutting means comprising a tapered blade at the second end of the cylindrical compression member, a taper compressing a core of fruit as it is being cut so as to retain the core in the compression member upon removal from the fruit, wherein the interior taper of the tapered blade is configured to change the inner diameter of the cylindrical compression member by a percentage in the range of 2 to 7 percent and adapted to facilitate an appropriate amount of fruit core compression for core removal from fruit;

c. planar cutting means comprising planar surfaces extending from the cylindrical wall of the cylindrical compression member inward, the planar surfaces largely parallel to the longitudinal axis of the cylindrical compression member, and d. a handle facilitating ease of manual use of the coring system, e. the cylindrical compression member insertable into a fruit along the axis of the fruit core, the cylindrical cutting means serving to slice the core of the fruit as the cylindrical compression member is advanced into the fruit, the taper of the cylindrical cutting means in concert with the wall thickness of the cylindrical compression member achieving the compression of the fruit core as the cylindrical compression member is advanced into the fruit, at a determined depth the cylindrical compression member rotated within the fruit by grasping the handle, the planar cutting means thereby shearing the sliced core from the fruit, said compression of the fruit core permitting retention of the fruit core in the cylindrical compression member as it is removed from the fruit.

2. A coring system as recited in claim 1, wherein the interior taper of the cutting blade exhibits a taper of approximately 15 degrees with respect to the longitudinal axis of the cylindrical compression member.

3. A coring system as recited in claim 1, wherein the cylindrical cutting means comprises a single taper edge from the interior to the exterior of the cylindrical compression member.

4. A coring system as recited in claim 1, wherein the cylindrical cutting means comprises a dual taper edge, comprising a taper surface emanating from both the interior and exterior surfaces of the cylindrical compression member.

5. A coring system as recited in claim 1, wherein the cylindrical cutting means comprises a serrated blade.

6. A coring system as recited in claim 1, wherein the cylindrical compression member is removeably attachable to the handle.

7. A coring system as recited in claim 1, which further comprises standoff collars of different lengths removeably attachable to the cylindrical compression member.

8. A coring system as recited in claim 1, where the cylindrical compression member exhibits a non-circular cross-sectional shape.

9. A coring system as recited in claim 1, wherein the planar cutting means comprises at least one blade extending from the inner wall of the cylindrical compression member to the interior of the cylindrical compression member.

10. A coring system as recited in claim 1, wherein the planar cutting means comprises a v-shaped blade attached to the wall of the cylindrical compression member.

11. A coring system as recited in claim 1, wherein the cylindrical cutting means and the planar cutting means are connected to the handle by means of legs.

12. A coring system as recited in claim 1, wherein the planar cutting means extends inwardly from the wall of the cylindrical compression member.

13. A coring system as recited in claim 1, wherein the planar cutting means comprises at least one blade extending largely the full length of the cylindrical compression member.

14. A coring system as recited in claim 1, wherein the cylindrical compression member exhibits an air channel largely extending the length of the cylindrical compression member.

15. A coring system as recited in claim 1, which further comprises a fruit core alignment subsystem.

16. A coring system as recited in claim 15, wherein the fruit core alignment subsystem further comprises:

a. an alignment cylinder exhibiting a diameter, circumference, and length with planar slots extending the full length of the alignment cylinder and extending inward from the circumference of the alignment cylinder, the diameter of the alignment cylinder incrementally less than the inside diameter of the cylindrical compression member, the planar slots located in the alignment cylinder so as to receive the planar cutting means when the cylindrical compression member is slid down over the alignment cylinder, the planar cutting means is configured to move past the planar slots when the cylindrical compression member is slides along the alignment cylinder, the cylindrical compression member is configured to rotate to permit the planar cutting means to shear the core of fruit, and b. an alignment pin that is largely coincident with the longitudinal axis of the alignment cylinder, a portion of the alignment pin extending from one end of the alignment cylinder and of a length greater than the length of candidate fruits to be cored, and affixed to alignment cylinder by attachment means;

c. the alignment pin insertable into a fruit along the axis of the core to extend completely through the fruit penetrating one end of the fruit proximal to the alignment cylinder and exiting another end of the fruit distal to the alignment cylinder when the alignment cylinder rests against the fruit, sliding the cylindrical compression member down on along the alignment cylinder aligns the coring system with the axis of the fruit core.

17. A coring system as recited in claim 15, wherein the fruit core alignment subsystem further comprises:

a. an alignment cylinder exhibiting a diameter, circumference, and length with planar slots extending the full length of the alignment cylinder and extending inward from the circumference of the alignment cylinder, the diameter of the alignment cylinder incrementally less than the inside diameter of the cylindrical compression member, the planar slots located in the alignment cylinder so as to receive the planar cutting means when the cylindrical compression member is slid down over the alignment cylinder, the planar cutting means is configured to move past the planar slots when the cylindrical compression member is slides along the alignment cylinder, the cylindrical compression member is configured to rotate to permit the planar cutting means to shear the core of fruit, and b. an alignment pin that is largely coincident with the longitudinal axis of the alignment cylinder, the alignment pin exhibiting tapered fins connected at their base to the alignment cylinder, the alignment pin and extending from one end of the alignment cylinder and of length greater than the length of the fruit to be cored, the alignment pin insertable into a fruit along the axis of the core to extend completely through the fruit penetrating one end of the fruit proximal to the alignment cylinder and exiting another end of the fruit distal to the alignment cylinder when the alignment cylinder rests against the fruit, sliding the cylindrical compression member along the alignment cylinder aligns the coring system with the axis of the fruit core.

18. A coring system as recited in claim 15, wherein the fruit core alignment subsystem further comprises:

a. a hollow cylinder exhibiting a longitudinal axis with a cylindrical cutting edge at one end and a cap or top at the other;
b. a cylinder cap or top affixed to one end of the hollow cylinder;
c. an alignment pin that is largely coincident with the longitudinal axis of the hollow cylinder affixed to the cylinder cap, the alignment pin of length sufficient to fully penetrate through the depth of a fruit core;
d. the alignment pin insertable into a fruit along the axis of the core to extend from one end of the fruit when the hollow cylinder rests against the opposing end of the fruit, upon insertion of the hollow cylinder a distance into the fruit, a guiding cut is created so that upon removal of the core alignment subsystem from the fruit, the cylindrical compression member can be inserted along this guiding cut to achieve alignment of the coring process.

19. A coring system as recited in claim 15, wherein the fruit core alignment subsystem further comprises:
    a. a cylindrical cap or top that is removably attachable to the cylindrical compression member at the location of the handle;
    b. an alignment pin that is affixed to the center of the cylindrical cap and is largely coincident with the longitudinal axis of the cylindrical compression member when the cylindrical cap is attached to the cylindrical compression member, whereby, when the cap is attached to the cylindrical compression member and the alignment pin is inserted along the core axis of the fruit, it permits direct alignment of the coring system with the core axis of the fruit.

20. A coring system as recited in claim 15, wherein the fruit core alignment subsystem further comprises an alignment pin coaxial with the cylindrical compression member and attached to the planar cutting means.

\* \* \* \* \*